United States Patent [19]

Grasman et al.

[11] 3,791,206
[45] Feb. 12, 1974

[54] FORCE-MEASURING SYSTEMS
[75] Inventors: Rudolf Grasman; Walter Hell, both of Vienna, Austria
[73] Assignee: Waagner-Biro Aktiengesellschaft, Vienna, Austria
[22] Filed: Sept. 15, 1972
[21] Appl. No.: 289,318

[30] Foreign Application Priority Data
Sept. 17, 1971  Austria .............................. 8120/71

[52] U.S. Cl. ............................................. 73/141 R
[51] Int. Cl. .......................................... G01l 1/26
[58] Field of Search ............... 73/141 R, 141 A, 143

[56] References Cited
UNITED STATES PATENTS
| | | | |
|---|---|---|---|
| 1,755,849 | 4/1930 | Temple | 73/141 R |
| 2,901,235 | 8/1959 | Bradley | 73/141 A X |
| 3,565,196 | 2/1971 | Laimins | 73/141 A X |

FOREIGN PATENTS OR APPLICATIONS
975,170   11/1964   Great Britain .................... 73/141 A Primary Examiner—Charles A. Ruehl
Attorney, Agent, or Firm—Steinberg & Blake

[57] ABSTRACT

A force-measuring system capable of converting a tensile force into a compressive force. A pulling force is applied to a crosshead which is capable of rocking freely with respect to the axis along which the pulling force extends, and this crosshead applies the pulling force to a plurality of pressure-measuring cells which are arranged uniformly in groups around the axis of the pulling force. The groups of pressure-measuring cells respectively engage supports which are freely tiltable and which are in turn supported by a stationary supporting structure, so that in response to the application of the pulling force to the crosshead the plurality of cells are capable of measuring the pulling force while being placed in compression.

9 Claims, 2 Drawing Figures

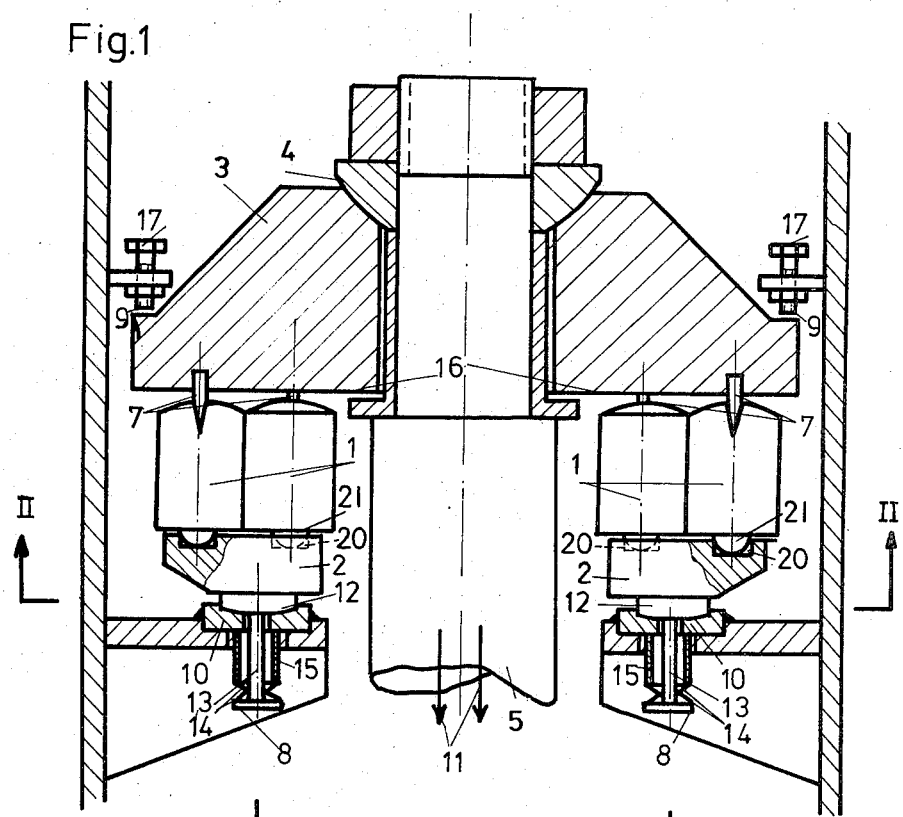
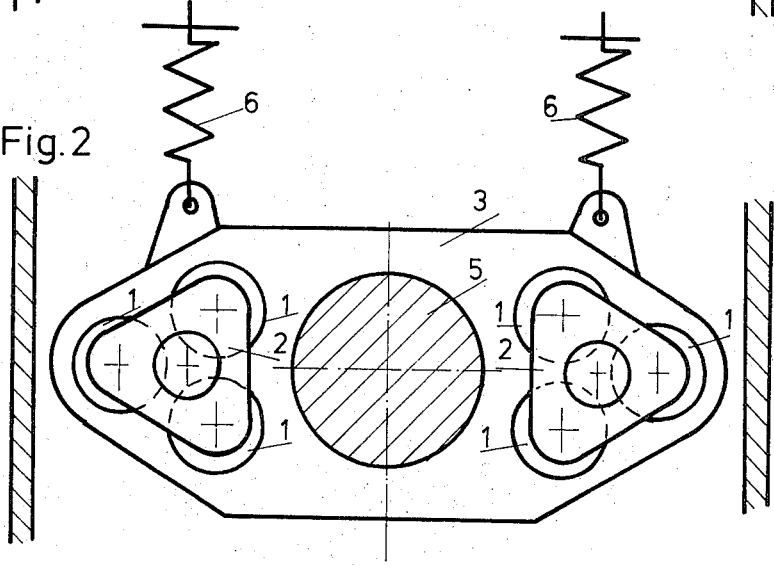

FORCE-MEASURING SYSTEMS

BACKGROUND OF THE INVENTION

The present invention relates to force-measuring systems.

In particular, the present invention relates to force-measuring systems capable of converting a tensile force into a compressive force.

The invention is particularly adapted for use with calibrated force-measuring devices in cable-stretching installations.

It is already known to situate between parallel surfaces force-measuring cells which are arranged in the force-measuring direction between these parallel surfaces. Inasmuch as the force-measuring cells are never of precisely the same size and since the pair of surfaces are never precisely parallel to each other, installations of this type do not provide a desirable high degree of accuracy and they cannot be calibrated.

SUMMARY OF THE INVENTION

It is accordingly a primary object of the present invention to provide a force-measuring system which will avoid these drawbacks.

In particular, it is an object of the present invention to provide a force-measuring system in which the lack of accuracy inherent in individual components will be automatically compensated so that calibration is possible and a high degree of accuracy can be achieved.

It is in particular an object of the present invention to provide a system of this type which operates by converting a tensile force into a compressive force.

Also, it is an object of the invention to provide a system of this type which is particularly adapted for use in cable-stretching installations.

According to the invention a force-applying means is provided for applying a pulling force along a given axis. A crosshead means surrounds this latter axis and extends transversely with respect thereto, and a connecting means is provided between the force-applying means and the crosshead means for applying the pulling force to the crosshead means from the force-applying means. A stationary support means is spaced from the crosshead means in the direction in which the pulling force extends, and a plurality of tiltable support means are uniformly distributed about the above given axis and are supported by the stationary support means for free tilting movement. A plurality of groups of force-measuring means respectively engage the plurality of tiltable support means and extend between the latter and the crosshead means to resist the pulling of the crosshead means by the force-applying means while being placed in compression between the crosshead means and the plurality of tiltable support means so that the plurality of pressure-measuring means can accurately measure the force applied to the crosshead means by the force-applying means.

BRIEF DESCRIPTION OF DRAWINGS

The invention is illustrated by way of example in the accompanying drawings which form part of this application and in which:

FIG. 1 is a fragmentary schematic sectional elevation showing one embodiment of a structure according to the invention taken in a plane which includes a central axis along which the pulling force is directed; and FIG. 2 is a transverse partly sectional elevation of the structure of FIG. 1 taken along line II-II of FIG. 1 in the direction of the arrows.

DESCRIPTION OF PREFERRED EMBODIMENTS

Referring now to FIGS. 1 and 2, the force-measuring system of the invention which is illustrated therein is particularly adapted for use in cable-stretching installations. The force which is to be measured is applied by way of a force-applying means formed by the elongated spindle 5 whose axis conicides with the axis along which a pulling force is applied in the directions indicated by the arrows 11. The spindle 5 which forms the force-applying means is surrounded by a crosshead means 3 in the form of a robust crosshead which extends transversely with respect to the axis along which the pulling force is applied by the force-applying means 5. A connecting means is provided for connecting the force-applying means 5 to the crosshead means 3, and this connecting means is formed by the pair of surfaces 4. Thus, the spindle 5 is surrounded by an element which directly engages the crosshead 3 and which has a convexly curved surface which in the illustrated example forms part of a cylinder whose axis is normal to the axis of the spindle 5. The surface of crosshead 3 which is slidably engaged by this cylindrical surface is itself of the very same curvature and so forms also part of this cylinder, so that in this way the connecting means 4 enables the crosshead means 3 to rock freely with respect to the force-applying means 5 about an axis which is normal to the axis along which the pulling force is directed.

The crosshead means 3 fixedly carries at its lower end, as viewed in FIG. 1, a plurality of centering pins 7 which terminate in lower substantially pointed ends extending into conical recesses formed at the top ends of a plurality of pressure-measuring means 1. Each of the pressure-measuring means 1 is in the form of a cell which is adapted to be placed in compression in a well known manner so that in response to the compressive force the pressure will be indicated by the pressure-measuring means 1. In the illustrated example the plurality of pressure-measuring means 1 are arranged in two groups each of which includes three pressure-measuring means 1, and these groups are uniformly distributed about the axis of the spindle 5 so that they are respectively located on diammetrically opposed sides of the spindle 5. Thus, the several groups of pressure-measuring means 1 are uniformly distributed about the axis along which the pulling force is directed.

The several groups of pressure-measuring means 1 respectively engage a plurality of tiltable support means 2. Each of the tiltable support means 2 is in the form of a plate having a plurality of recesses 20 which respectively receive the spherical ends 21 of the plurality of pressure-measuring means 1, as is particularly apparent from FIG. 1. As is apparent from FIG. 2, these spherical ends 21 of each group of pressure-measuring means 1 engage the tiltable support means 2 at points which, in a plane normal to the axis along which the pulling force is directed, are located at the corners of an equilateral triangle. Each tiltable support means 2 is supported by a stationary support means formed by a stationary bearing member 10 carried by the stationary frame structure. Thus, the stationary support means includes a plurality of stationary members 10 having concave surfaces which form parts of spheres while the plurality of tiltable support means 2 have members 12 of spherical configuration engaging the spherical seats formed by the members 10, so that in this way the several tiltable support means 2 are supported by the stationary support means for free tilting movement.

Thus, with this particular arrangement according to which the several pressure-measuring means 1 are arranged between the crosshead means 3 and the freely tiltable support means 2, all of the pressure-measuring means 1 will be uniformly placed in compression so that they will all be equally loaded, irrespective of a lack of uniformity in the exact structural details of the several pressure-measuring means 1 with respect to each other.

In order to avoid undesirable shifting when the system is not loaded, a spring means is connected to each of the tiltable support means 2. The spring means 8 includes an elongated pin 13 fixed to the part 12 of each tiltable support means and extending freely through a tubular guide 15 of the stationary support means. At its bottom end each pin 13 has an enlarged end portion engaging a spring element 14 compressed between the enlarged bottom end of each pin 13 and the bottom end of the tube 15.

In the event that the spindle 5 is arranged horizontally, it is desirable to avoid measuring inaccuracies resulting from the weight of the crosshead itself. For this purpose, as shown in FIG. 2, a spring means 6 is connected to and supports the crosshead means 3 in order to compensate precisely for the weight of the crosshead 3 itself, so that the spindle 5 is not stressed by the weight of the crosshead means 3.

As was indicated above, the connecting means 4 in the illustrated example takes the form of a pair of cylindrical surfaces engaging each other. This construction is used when there are only two groups of pressure-measuring means 1 equidistantly arranged from each other on opposite sides of the axis along which the pulling force is directed. Thus, with this construction the flat end surface 16 of the crosshead means 3 can automatically assume whatever direction is required in order to uniformly apply the force among the several pressure-measuring means 1. However, in the event that more than two groups of pressure-measuring means 1 and more than two tiltable support means 2 are used, with this greater number of units also being uniformly distributed about the axis of the spindle 5, then at the connecting means 4 the slidably engaging surfaces form part of a sphere so that the crosshead means 3 can in this case rock in any desired direction for uniformly applying the force to all of the pressure-measuring means 1.

In order to maintain the plurality of pressure-measuring means 1 assembled with the plurality of tiltable support means 2 and the crosshead means 3 at the pointed portions of the pin 7 of the latter which enter the corresponding conical recesses at the ends of the several pressure-measuring means 1, a stop means is provided for limiting the extent to which the crosshead means 3 can move away from the stationary support means 10. This stop means includes a plurality of stop members 9 respectively fixed to the free ends of screws 17 which are directed toward the side of the crosshead means 3 which is directed away from the stationary support means 10. These screws 17 are threaded through suitable fixed brackets and carry lock nuts so that they can be fixed at selected positions where the desired limitation on the free movement of the crosshead means 3 away from the stationary support means 10 can be achieved.

What is claimed is:

1. In a force-measuring system, adapted for use with a cable-stretching installation, for converting a tensile force into a compressive force, force-applying means for providing a pulling force extending along a given axis, crosshead means surrounding said force-applying means and extending transversely with respect thereto, connecting means connecting said force-applying means to said crosshead means for applying said pulling force to said crosshead means while freeing said crosshead means for rocking movement about at least one axis which is normal to said given axis, stationary support means spaced from said crosshead means in the direction of said pulling force, a plurality of tiltable support means uniformly distributed about said given axis and situated between said stationary support means and said crosshead means, said plurality of tiltable support means each being supported by said stationary support means for free tilting movement in all directions, and a plurality of groups of pressure-measuring means also uniformly distributed about said given axis with said groups respectively engaging said plurality of tiltable support means and extending between the latter and said crosshead means for opposing pulling of said crosshead means by said force-applying means while being placed in compression between said crosshead means and said plurality of tiltable support means for measuring the pulling force.

2. The combination of claim 1 and wherein a spring means supports said crosshead means while compensating for the weight of the crosshead means itself.

3. The combination of claim 1 and wherein said crosshead means includes a plurality of centering pins respectively engaging said plurality of pressure-measuring means for directly applying forces thereto, respectively.

4. The combination of claim 1 and wherein said connecting means includes a pair of surfaces which respectively form part of said force-applying means and said crosshead means, said pair of surfaces having the same curvature and slidably engaging each other, and said pair of surfaces both forming part of a cylinder whose axis is normal to said given axis.

5. The combination of claim 1 and wherein said stationary support means has a plurality of seats respectively forming parts of spheres and said plurality of tiltable support means respectively have portions also forming parts of spheres and respectively engaging said seats to provide free tilting of said plurality of tiltable support means with respect to said stationary support means, and a plurality of spring means operatively connected with said plurality of tiltable support means, respectively, for urging the latter toward said seats of said stationary support means.

6. The combination of claim 1 and wherein a stop means is situated at the side of said crosshead means opposite from said stationary support means for limiting the movement of said crosshead means away from said stationary support means.

7. The combination of claim 1 and wherein there are two groups of pressure-measuring means symmetrically arranged with respect to said given axis.

8. The combination of claim 1 and wherein each group of pressure-measuring means includes three pressure-measuring means respectively having three end portions engaging a tiltable support means respectively at points which in a plane normal to said given axis are located at the corners of an equilateral triangle.

9. The combination of claim 8 and wherein said end portions of said pressure-measuring means have a spherical configuration.

* * * * *